United States Patent
Shacklette et al.

(10) Patent No.: US 8,708,576 B2
(45) Date of Patent: Apr. 29, 2014

(54) ELECTRO-OPTICAL DEVICE HAVING AN ELASTOMERIC BODY AND RELATED METHODS

(75) Inventors: Lawrence Wayne Shacklette, Melbourne, FL (US); Michael Ray Lange, Melbourne, FL (US); Michael Raymond Weatherspoon, West Melbourne, FL (US); Gary M. Singer, Indian Harbour Beach, FL (US)

(73) Assignee: Harris Corporation, Melbourne, FL (US)

( * ) Notice: Subject to any disclaimer, the term of this patent is extended or adjusted under 35 U.S.C. 154(b) by 560 days.

(21) Appl. No.: 13/010,422

(22) Filed: Jan. 20, 2011

(65) Prior Publication Data

US 2012/0189253 A1  Jul. 26, 2012

(51) Int. Cl.
G02B 6/42 (2006.01)
G02B 6/12 (2006.01)
G02B 6/43 (2006.01)

(52) U.S. Cl.
CPC .. *G02B 6/42* (2013.01); *G02B 6/43* (2013.01); *G02B 6/4214* (2013.01)
USPC ................................. 385/88; 385/14; 385/33

(58) Field of Classification Search
None
See application file for complete search history.

(56) References Cited

U.S. PATENT DOCUMENTS

| | | | |
|---|---|---|---|
| 5,058,983 A | 10/1991 | Corke et al. | 385/78 |
| 5,515,465 A | 5/1996 | Olin et al. | 385/64 |
| 5,619,610 A | 4/1997 | King et al. | 385/139 |
| 5,761,350 A * | 6/1998 | Koh | 385/14 |
| 5,778,127 A | 7/1998 | Gilliland et al. | 385/92 |
| 6,097,873 A | 8/2000 | Filas et al. | 385/140 |
| 6,477,284 B1 | 11/2002 | Oda et al. | 385/14 |
| 6,501,900 B1 | 12/2002 | Aloisio, Jr. et al. | 385/140 |
| 6,611,635 B1 | 8/2003 | Yoshimura et al. | 385/14 |
| 6,661,939 B2 * | 12/2003 | Kaneko et al. | 385/14 |
| 6,785,447 B2 | 8/2004 | Yoshimura et al. | 385/42 |
| 6,907,151 B2 * | 6/2005 | Yunus | 385/14 |
| 6,996,303 B2 | 2/2006 | Glebov et al. | 385/14 |
| 7,092,603 B2 * | 8/2006 | Glebov et al. | 385/51 |
| 7,133,592 B2 * | 11/2006 | Yasuda et al. | 385/145 |
| 7,218,825 B2 | 5/2007 | Jeon et al. | 385/129 |

(Continued)

FOREIGN PATENT DOCUMENTS

DE          10248505          4/2004

OTHER PUBLICATIONS

Alexei L. Glebov et al., Optical Engineering, Integration Technologies for Pluggable Backplane Optical Interconnect Systems, (Jan. 2007) 46(1) 015403 pp. 1-10.

(Continued)

*Primary Examiner* — Michelle R Connelly
(74) *Attorney, Agent, or Firm* — Allen, Dyer, Doppelt, Milbrath & Gilchrist, P.A.

(57) ABSTRACT

An electro-optical device may include a substrate having opposing first and second surfaces and an opening extending therebetween. The optical device may also include an optical waveguide extending laterally along the first surface and having an end aligned with the opening, and an electro-optical component carried by the second surface and aligned with the opening. The electro-optical device may further include an elastomeric body within the opening and having a first end face adjacent the optical waveguide and having a second end face adjacent the electro-optical component. The elastomeric body and the optical waveguide may have respective gradient refraction indices within ±5% of each other.

29 Claims, 11 Drawing Sheets

(56) References Cited

U.S. PATENT DOCUMENTS

| | | | |
|---|---|---|---|
| 7,466,880 B2 * | 12/2008 | Windover | 385/14 |
| 7,466,893 B2 | 12/2008 | Higuchi et al. | 385/143 |
| 7,505,650 B1 | 3/2009 | Grzybowski et al. | 385/13 |
| 7,551,811 B2 * | 6/2009 | Aoki et al. | 385/14 |
| 7,616,856 B2 | 11/2009 | Zhou et al. | 385/124 |
| 7,728,399 B2 | 6/2010 | Walberg et al. | 257/434 |
| 8,090,266 B2 * | 1/2012 | Glebov et al. | 398/139 |
| 8,137,001 B2 | 3/2012 | Shacklette et al. | |
| 8,175,426 B2 | 5/2012 | Shacklette | |
| 8,195,016 B2 | 6/2012 | Shacklette | |
| 8,231,281 B2 | 7/2012 | Shacklette et al. | |
| 2002/0051599 A1 | 5/2002 | Tsukamoto et al. | |
| 2004/0126064 A1 | 7/2004 | Vandentop et al. | |
| 2005/0117833 A1 | 6/2005 | Fukuzawa et al. | |
| 2005/0207693 A1 * | 9/2005 | Yokouchi | 385/14 |
| 2009/0084584 A1 | 4/2009 | Cho et al. | |
| 2009/0214156 A1 * | 8/2009 | Okubo et al. | 385/14 |
| 2010/0034497 A1 * | 2/2010 | Glebov et al. | 385/14 |
| 2011/0069464 A1 * | 3/2011 | Joe et al. | 361/783 |
| 2011/0104388 A1 | 5/2011 | Shacklette et al. | |
| 2012/0013967 A1 * | 1/2012 | Kim | 359/290 |

OTHER PUBLICATIONS

Robert W. Filas et al., Index-Matching Elastomers for Fiber Optics, IEEE vol. 13. No. 1, (Mar. 1990) pp. 133-136.

R.H. Laughlin et al., Frustrated Total Internal Reflection an Alternative for Optical Cross-Connect Architectures, IEEE (Apr. 1998) pp. 171-172.

B. Lunitz et al., Experimental Demonstration of 2.5 Gbit/s Transmission with 1 m Polymer Optical Backplane, Electronic Letters (Aug. 16, 2001) vol. 37 No. 17 p. 1079.

\* cited by examiner

ELECTRO-OPTICAL DEVICE HAVING AN ELASTOMERIC BODY AND RELATED METHODS

FIELD OF THE INVENTION

The present invention relates to the field of electro-optics, and, more particularly, an electro-optical device, and related methods.

BACKGROUND OF THE INVENTION

An optical fiber is commonly used for communicating data signals over both short and long distances. Compared with other communication mediums, such as a metal wire, an optical fiber is advantageous in that signals travel along it with less loss, and it is also less susceptible to electromagnetic interference. An optical fiber also offers a much higher bandwidth than wire (i.e., data carrying capacity.

One disadvantage of an optical fiber, however, is that it is difficult to couple to another optical fiber or to another component, for example, an electro-optical component, as discontinuities at a connection point may lead to light reflection and losses that degrade signal quality. Another disadvantage for an optical fiber or for a more general form of an optical waveguide is optical loss when the light guiding medium is bent at a relatively sharp angle. Another limitation, which may strongly affect glass optical fiber, is the possibility of breakage or decreased long term reliability when the fiber is held in a bent condition. It is known in the art to use optical fiber to construct an optical backplane for interconnecting board-mounted electro-optical components. Such an application is subject to the limitation discussed herein. For example, a problem in constructing a hybrid electrical and optical circuit board is achieving vertical optical interconnects between optical waveguide layers and optical components or layers on different levels.

This problem is often called the 90-degree bend problem, since light traveling in a waveguide layer that typically includes a planar array of optical waveguides or fibers executes a 90-degree bend to traverse the distance between vertically stacked electrical or optical layers. In cases where the optical layer or layers are built with optical fibers, bending the fiber at 90 degrees may be only accomplished over a relatively large radius, for example, greater than about 4 cm. Alternatively, an abrupt 90-degree bend in the light path can be made by use of a mirror, for example, but unless a focusing optic or another guiding medium is provided at the mirror point, the light will become unguided and will spread out resulting in signal loss as it travels in the vertical direction.

More particularly, optical layers in a circuit board may be fabricated with optical fiber or planar optical waveguides. In the case where an optical layer is fabricated with an optical fiber, an optical fabric may be formed on a flexible substrate, such as a polymer film, so that the fabric can be bent out-of-plane for a vertical interconnection, but with the restriction that the bend radius be large. For planar light guides, a mirror may be included to deflect the light vertically, and external lenses may be employed to focus the light between sources and detectors, thereby accomplishing a 90-degree turn in a reduced space. The fabrication process in this case may involve the assembly of micro-optical elements, which may be relatively costly. Accordingly, when possible, many electro-optical components are edge or side coupled to an optical waveguide.

U.S. Pat. No. 7,218,825 to Jeon et al. discloses an optical waveguide having a curved reflective mirror surface. Partition blocks are beside ends of the optical waveguide. A liquid polymer is dropped between the partition blocks. U.S. Pat. No. 6,611,635 to Yoshimura et al. is directed to an electro-optical interconnect substrate. More particularly, Yoshimura et al. discloses an optical waveguide core on a top surface of a substrate and having an end terminating adjacent to a side surface of an electro-optical device. An upper cladding is formed over the optical waveguide core.

U.S. Pat. No. 5,778,127 to Gilliand et al. discloses an optical transceiver apparatus which has a housing including a diode package aligned with a lens, and having an optical filler composition injected therebetween. The optical filler composition comprises a silicone elastomer which may be used as an index matching element, as a positioning and locking means, or an optical attenuator. Other exemplary approaches for optical fiber connectors or terminations are set forth in the following references: U.S. Pat. No. 5,619,610 to King et al.; U.S. Pat. No. 5,515,465 to Olin et al.; U.S. Pat. No. 6,501,900 to Aloisio, Jr. et al.; U.S. Pat. No. 6,097,873 to Filas et al.; and U.S. Pat. No. 5,058,983 to Corke et al.

SUMMARY OF THE INVENTION

In view of the foregoing background, it is therefore an object of the present invention to provide an electro-optical device addressing the 90-degree bend difficulties of the prior art.

This and other objects, features, and advantages are provided by an electro-optical device that includes a substrate having opposing first and second surfaces and an opening extending therebetween. The optical device also includes at least one optical waveguide extending laterally along the first surface and having an end aligned with the opening, and may include an electro-optical component carried by the second surface and aligned with the opening, for example. Alternatively, the electro-optical device may include a second optical waveguide on the second surface that includes a second mirrored end aligned with the opening.

The electro-optical device further includes an optical body, which may be a transparent optical body, and which may be an elastomeric body within the opening and having a first end face contacting, or in a relatively close proximity with the optical waveguide and having a second end face contacting or in a relatively close proximity with the electro-optical component. Accordingly, the electro-optical device provides a 90-degree coupling and also provides reduced signal loss.

To better confine the light and to reduce signal loss the optical body should have a refractive index that is higher than air. Preferably the optical body and the core of the optical waveguide have respective refractive indices within ±5% of each other, for example. In an embodiment, the optical body may also be an optical waveguide having a core and a cladding, wherein the refractive index of the core is greater than the refractive index of the cladding. The core and the cladding of the optical body may have refractive indices within ±5% of the corresponding indices of the waveguide to which it couples on the first surface. Similarly, the shape of the core and the cross-sectional area of the core of the optical body and the waveguide preferably may match within about 5%. In the case where the optical waveguides on the first surface includes a graded index profile, the refractive index profile of the optical body may closely match the refractive index profile of the core of the optical waveguide. The optical body may have a refractive index profile that is within ±5% of the corresponding index profile of the waveguide.

The second end face of the elastomeric body may extend outwardly beyond the second surface defining an optical bump. The second end face of the optical body may be pressed against the electro-optical component, for example, to mechanically form an optical connection. In such a case the tip of the bump may be compressed to form an area of contact with the electro-optic device that allows the light to traverse the interface with reduced optical loss from scattering or reflection. In this embodiment the optical body may include an optical material that is deformable under compression.

The optical body includes an elastomeric polymer, for example. The elastomeric body includes a core and a cladding surrounding the core. The elastomeric body core has a higher index of refraction than the elastomeric body cladding, for example. A reflective coating may be on the end of the optical waveguide. In addition, the optical waveguide includes a core, a cladding surrounding the core, and optionally a buffer layer surrounding the cladding. The waveguide may include any suitable material transparent to light at the wavelength of intended use. Such materials may include, for example, silicon, fused silica, glass, sapphire, polymers, and the like.

The substrate includes a circuit board having a plurality of electrical connection areas. The electro-optical component may include a package, an optical device within the package, and a plurality of electrical connection areas carried by the package and coupled to corresponding ones of the electrical connection areas of the circuit board, for example. An underfill material may be between the package and adjacent portions of the circuit board, for example, for greater mechanical coupling.

A method aspect is directed to a method of making an electro-optical device. The method includes forming an optical waveguide to extend laterally along a first surface of a substrate having opposing first and second surfaces and an opening extending therebetween with an end of the optical waveguide aligned with the opening. The method further includes forming a mirror surface on the end of the waveguide to deflect the light 90 degrees into the opening, and forming an optical body within the opening and having a first end face adjacent the optical waveguide and having a second end face adjacent, and preferably contacting, the electro-optical component. The method may further include positioning an electro-optical component on the second surface, aligned with the opening, and adjacent to, and preferably in contact with the second end face of the elastomeric body.

BRIEF DESCRIPTION OF THE DRAWINGS

FIG. 10b is a cross-section view of the portion of the electro-optical device of FIG. 10a.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
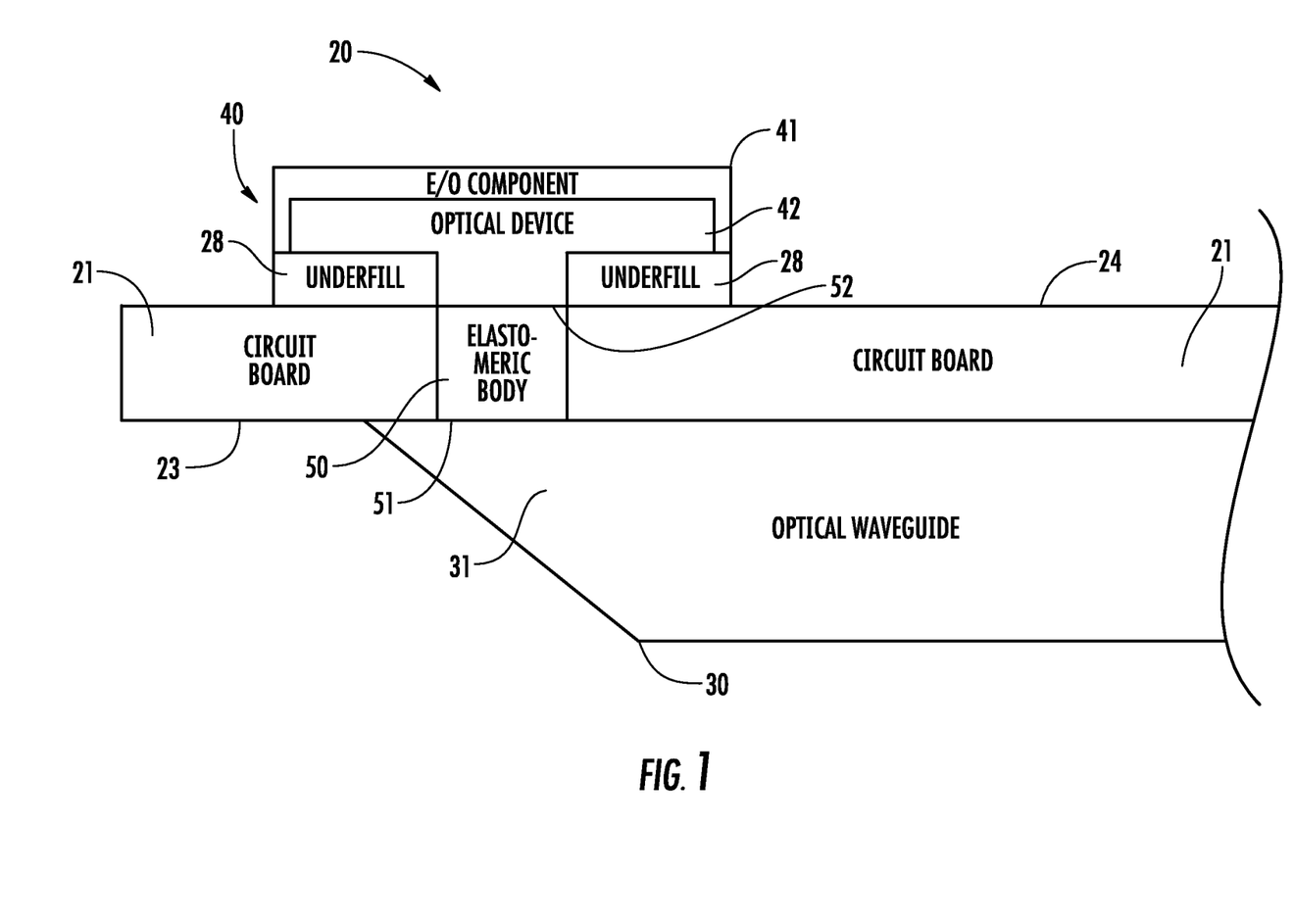
FIG. 1 is a schematic block diagram of an electro-optical device in accordance with the present invention.
Figure 2:
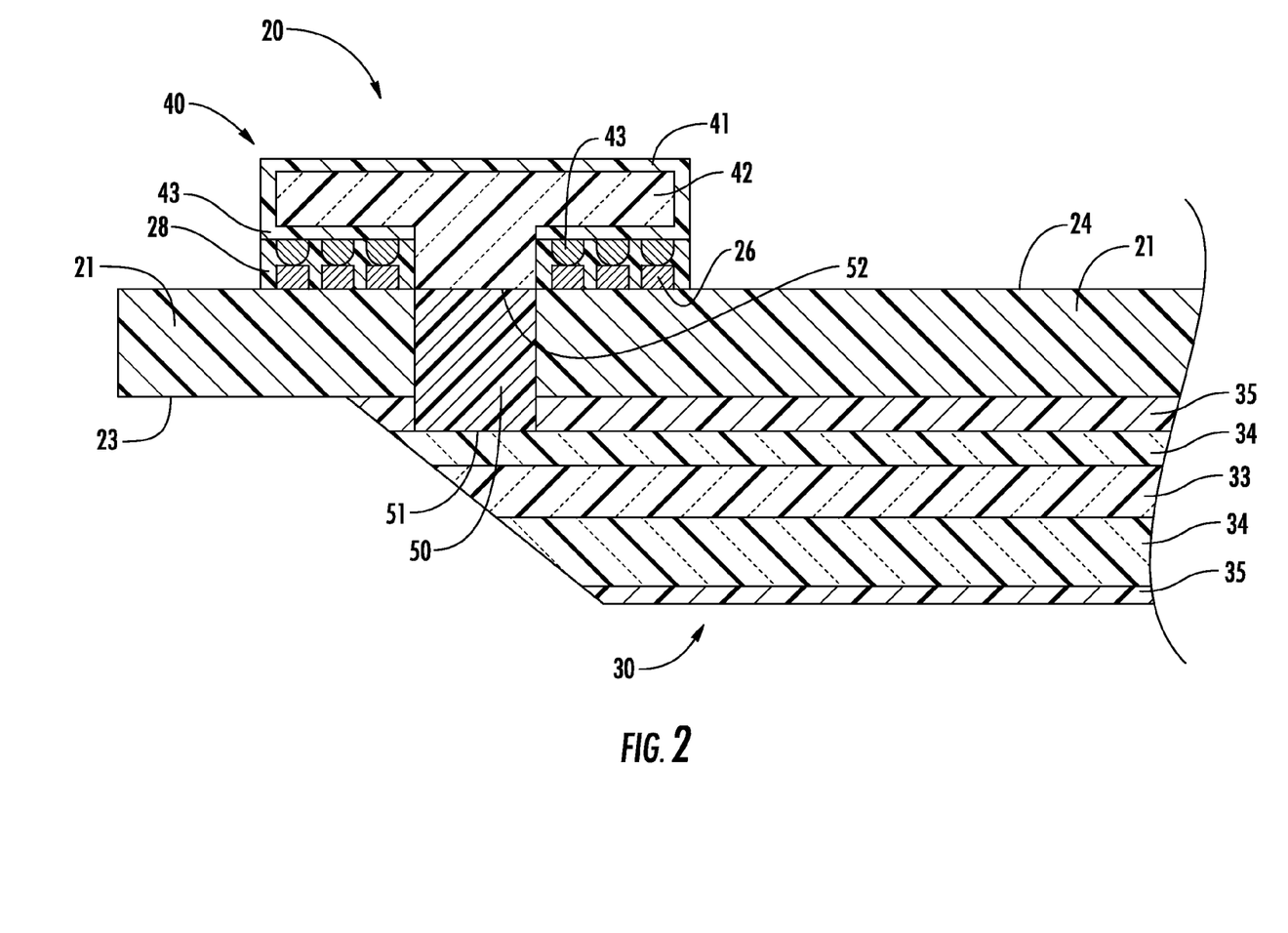
FIG. 2 is a cross-section view of the electro-optical device in FIG. 1.

Referring initially to FIGS. 1-2, an electro-optical device 20 illustratively includes a substrate or circuit board 21, for example a printed circuit board (PCB), having opposing first and second surfaces 23, 24 and an opening extending therebetween. The circuit board 21 includes electrical connection areas 26. The material of the substrate, or circuit board 21 may be flexible or rigid, and may comprise one of various organic materials known in the art, such as, for example, polyimide, epoxy, liquid crystal polymer, fluoropolymer, bismaleimide triazine, and the like. Alternatively the substrate or circuit board 21 may include an inorganic material, for example, low temperature co-fired ceramic (LTCC), silicon, aluminum nitride, sapphire, alumina, and the like. Other types of substrates may be used, as will be appreciated by those skilled in the art.

The electro-optical device 20 also includes an optical waveguide 30 extending laterally along the first surface 23 and having an end 31 aligned with the opening. The optical waveguide 30 includes a core 33 (e.g., a higher refractive index polymer or silica glass core) having a core index of refraction, and a respective cladding 34 (e.g., a lower refractive index polymer or pure silica) surrounding the core and having a cladding index of refraction less than that of the core. A buffer layer 35 optionally surrounds the cladding 34. The end 31, including the core 33, cladding 34, and the buffer layer 35, is at an angle less than ninety degrees, and more particularly at about 45 degrees, which advantageously reflects light toward the opening.

An electro-optical component 40 is carried by the second surface 24 and also aligned with the opening. The electro-optical component 40 includes a package 41 or component housing, which may be optional, and an optical device 42 within the package. Included within such device may be an optical port (not shown) that admits or emits an optical signal. The electro-optical component 40 also includes electrical connection areas 43 carried by the package 41 and coupled to the substrate 21 or circuit board electrical connection areas 26 (FIG. 2).

The electro-optical component 40 may be a light receiver or light emitter. For example, the electro-optical component 40 may be a vertical cavity surface emitting laser (VCSEL). The package 41 may be a flip-chip package or die, for example, and the electrical connection areas 43 may be a grid array (FIG. 2). Alternatively, the package 41 may be a zero-insertion force (ZIF) package, or the like, (not shown) for coupling with a ZIF-type socket carried by the substrate 21. Additionally, an underfill material 28 is optionally between the package 41 and adjacent portion of the circuit board 21.

The electro-optical device 20 also includes an optical body 50, and more particularly, an elastomeric body within the opening and having a first end face 51 contacting the optical waveguide 30. The optical body 50 may be other materials, as will be appreciated by those skilled in the art. The elastomeric body 50 also has a second end face 52 contacting the electro-optical component 40. In some embodiments, the first end face 51 may be in relatively close proximity or adjacent to the optical waveguide, and the second end face 52 may also be in relatively close proximity to the electro-optical component 40. For example, as used herein, close proximity may be defined as having a gap less than 100 microns. The elastomeric or optical body 50, which is preferably substantially transparent to light in the near infrared part of the optical spectrum, is effectively an optical via that conducts light from one layer to another layer with reduced optical loss.

The elastomeric body 50 includes an elastomeric polymer. An elastomeric material that is elastically deformable is particularly preferred when the electro-optical component 40 is removable and replaceable. Of course, the elastomeric body 50 may be other materials having varying degrees of elastomeric properties and hardness. For example, materials may include acrylates, epoxies, and polysiloxanes in formulations designed to be cured by ultraviolet light or by ultraviolet light exposure followed by heating.

The elastomeric body 50 has refractive index that is within ±5% of the index of refraction of the core of the optical waveguide. The elastomeric body 50 may be formed from different monomers or oligomers in relative amounts so that the cured elastomeric polymer body 50 refractive index is within the ±5% of the optical waveguide core refractive index. For example, if the core 33 of the optical waveguide 30 has a graded index, the elastomeric body 50 may be formed to have a graded index within ±5% of graded index core.

As will be appreciated by those skilled in the art, the elastomeric body 50 advantageously is matched so that light that may be reflected from the angled end 31 of the optical waveguide 30 may experience less back reflection and less spreading. Spreading of the beam of light, which is due to the divergence of the beam after it leaves the confines of the waveguide, can result in increased loss if it spreads outside of the area of a detector or outside of the acceptance cone of a second waveguide on the second layer. The same detriment from spreading also applies to light coming from a source on the second layer to be reflected from the mirror and into the waveguide on the first layer. Spreading may be reduced over what would be seen with open air between the electro-optical component 40 and the end 31 of the optical waveguide 30, because the optical body provides a higher index of refraction, which reduces the angle of divergence.

Advantageously, the elastomeric body 50 may conform at its first end face 51 to the surface of the waveguide 30, and at its second end face 52 to the surface of the electro-optical component 40. The ability to conform and to wet out against the surfaces of the waveguide and the electro-optical component 40 may eliminate air pockets that would cause light from the optical waveguide or the electro-optical device to reflect or to scatter, thus causing an increased optical loss.

Conforming of the elastomeric body 50 at its first end face 51 to the waveguide 30 may be accomplished by filling the opening in the substrate or circuit board 21 with a liquid monomer formulation with the waveguide in place and polymerizing this formulation in situ with UV light. Conforming of the second end face 52 to the electro-optical component 40, and more particularly, the optical device 42, is facilitated by allowing the elastomeric body 50 to extend above the second surface 24 of the circuit board 21 and then compressing the electro-optical component against the second end surface with mechanical force. In other words, the second end face 52 is pressed against the electro-optical component 40, and more particularly, the optical device 42. Once assembled, the force may be maintained with the help of the underfill 28 or with a socket for the electro-optical device that exerts mechanical pressure. The elastomeric body 50 advantageously guides light and may act as an extension of the optical waveguide 30, for example.

Figure 3:
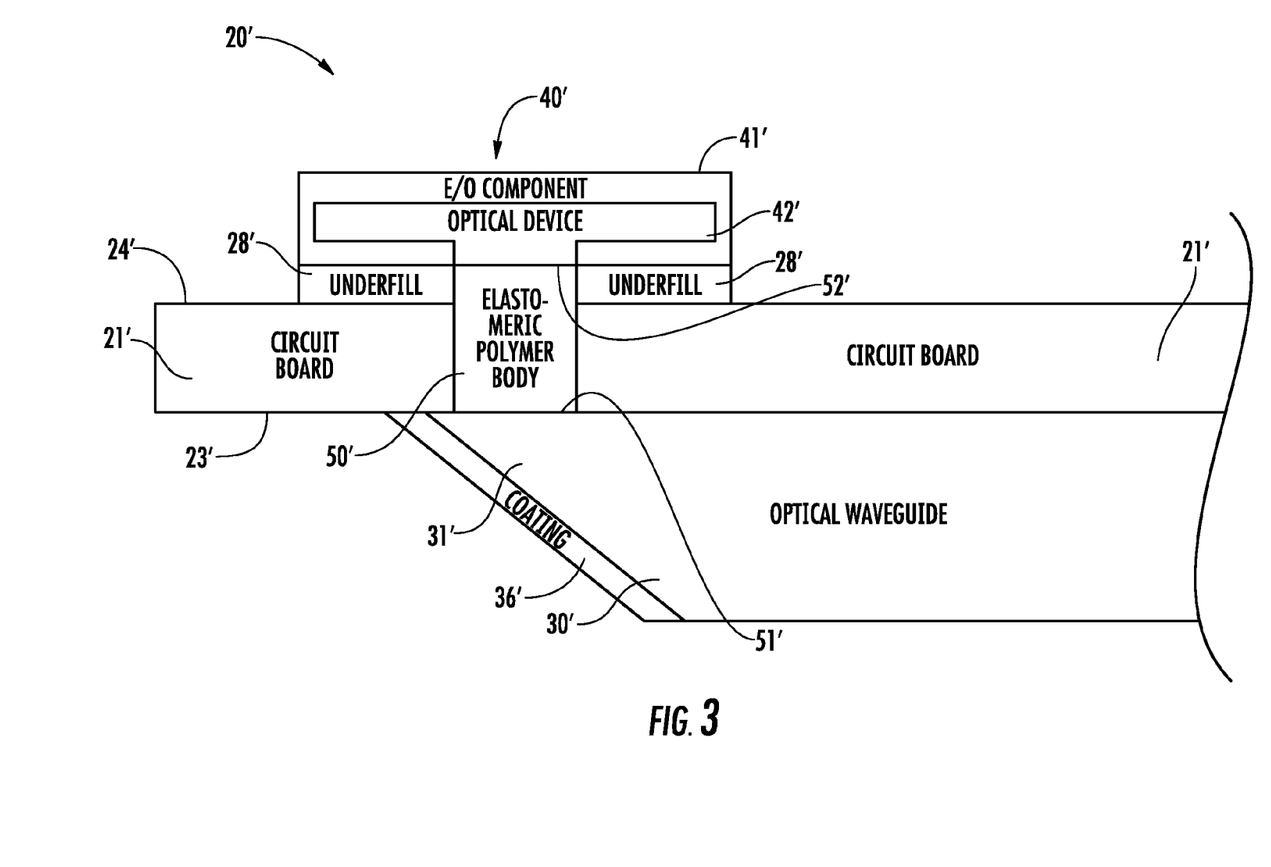
FIG. 3 is a schematic block diagram of an electro-optical device in accordance with another embodiment of the present invention.
Figure 4:
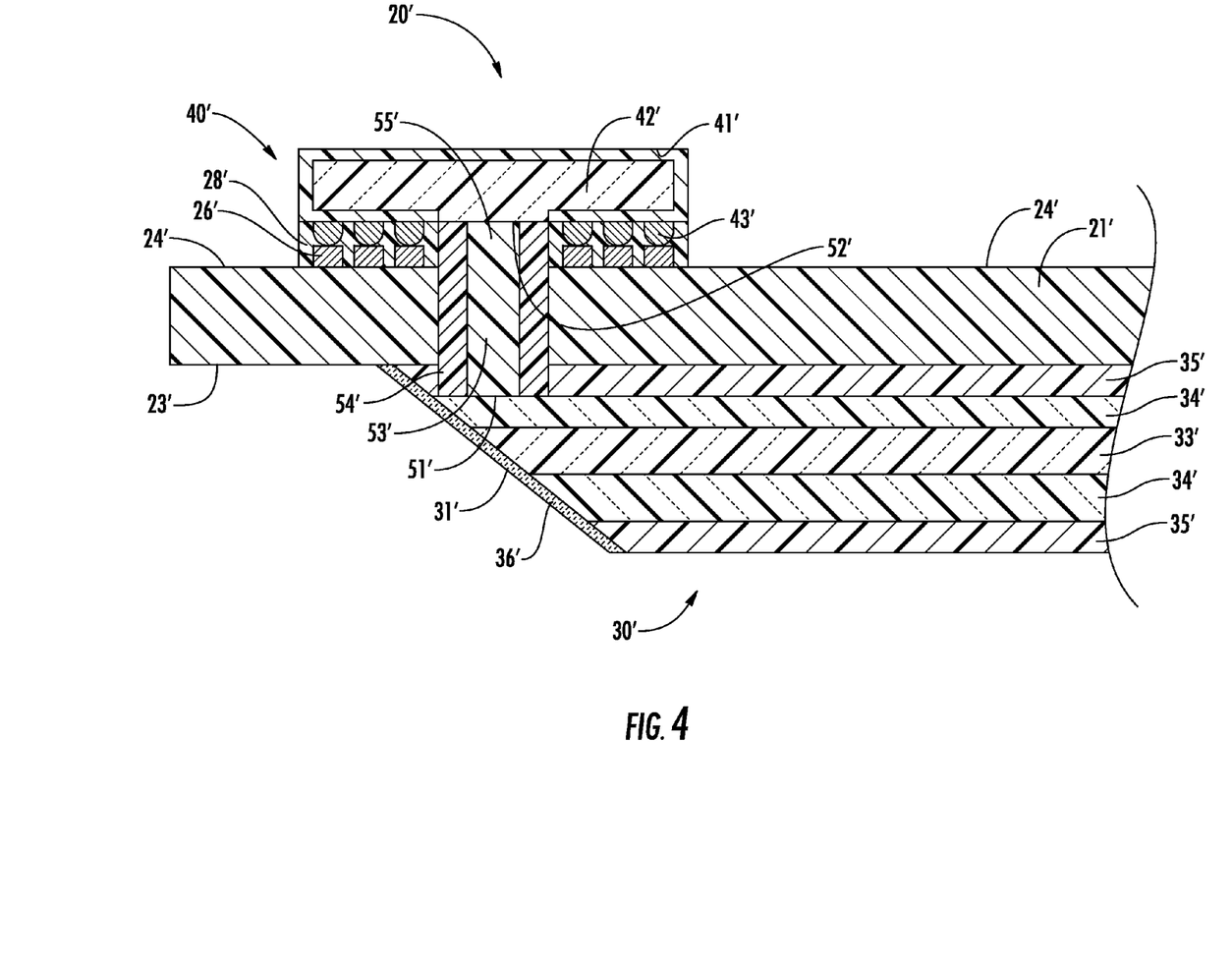
FIG. 4 is a cross-section view of the electro-optical device in FIG. 3.
Figure 5:
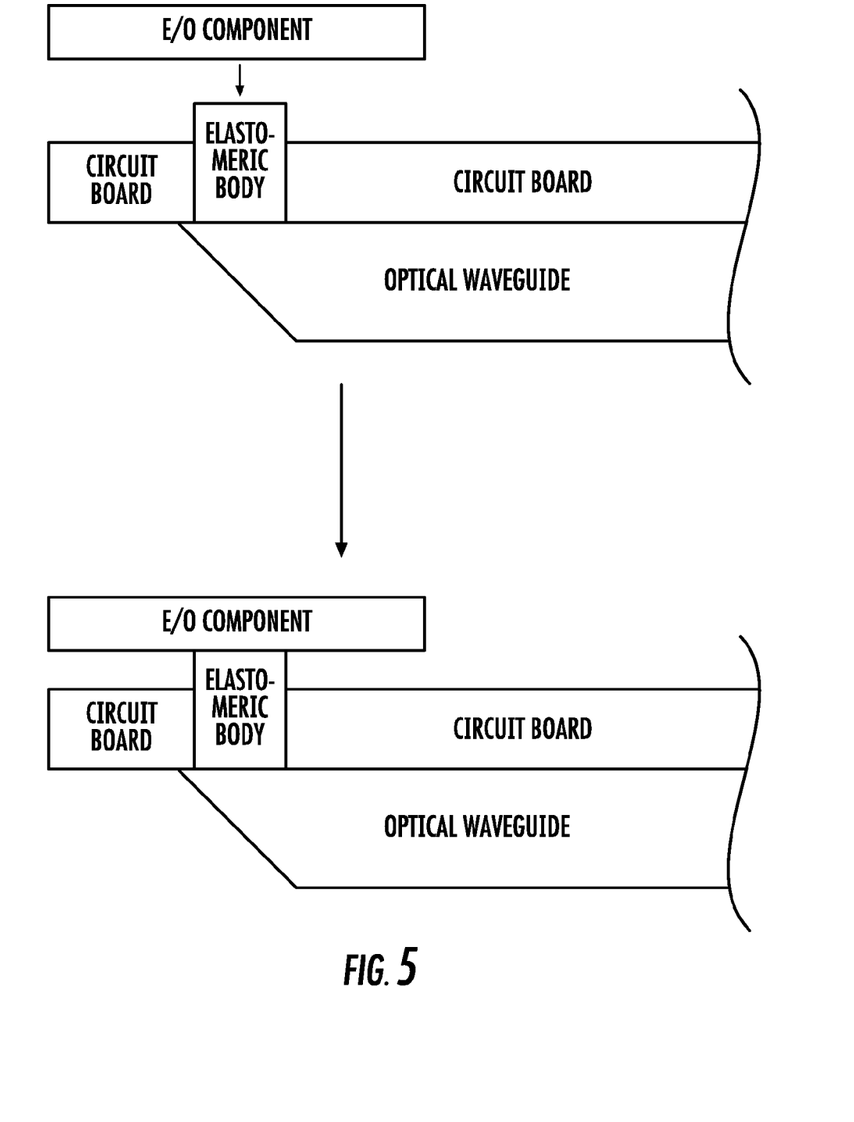
FIG. 5 is a pair of schematic block diagrams illustrating a portion of a method of making the electro-optical device of FIG. 3.

Referring now to FIGS. 3-5, another embodiment of an electro-optical device 20' is described. An end 31', including the core 33', cladding 34', and the buffer layer 35', is at an angle less than ninety degrees, and most preferably at about 45 degrees, which advantageously reflects light toward the opening. A reflective coating 36', which may be optional, is on the end 31' of the optical waveguide 30'. For example, a metallic surface may be used to reflect light within the optical waveguide 30'. This approach typically reflects all of the modes carried by a multimode waveguide, but may incur losses due to the fact that the metal may absorb some of the light.

An alternative approach is to leave the surface or the end 31' uncoated and rely upon total internal reflection to create the effect of a mirror. This effect relies on having a relatively large difference of index of refraction across the interface or end 31'. For example, an optical waveguide may have a core refractive index of about 1.5 and be angled to form a 45-degree interface with air having an index of 1.0. In this case, depending on the range of guided modes supported by the optical waveguide, most, but perhaps not all, of the modes in a multimode guide would be reflected at the interface without loss, if the surface were smooth.

The second end face 52' of the elastomeric body 50' advantageously extends outwardly beyond the second surface 24' defining an optical bump 55'. As will be appreciated by those skilled in the art, the optical bump 55' advantageously replaces an optical adhesive, for example, that may conventionally form the optical interface between an electro-optical component and the end of the optical waveguide. The second end face 52' of the elastomeric body 50' is illustratively pressed against the electro-optical component 40', and more particularly, the optical device 42' (FIG. 5). As will be appreciated by those skilled in the art, the optical bump 55', when it includes an elastomeric material, defines a reusable connection between the electro-optical component 40' and the optical waveguide 30'. The second end face 52' of the elastomeric body 50' may not extend beyond the second surface 24' to define an optical bump, in which case an optically transparent underfill material may be advantageously employed to fill the small remaining gap between the second end face 52' and the electro-optical component 40'.

An inner portion 53', or core, of the elastomeric body 50' has a first index of refraction and is optically aligned with the core 33' of the optical waveguide 30'. The first index of refraction advantageously is within ±5% of the index of refraction of the core 33' of the optical waveguide 30'. That is, the index of refraction of the elastomeric body inner portion 53' is chosen to be substantially the same as that of the core 33' of the optical waveguide 30'. When the core index of refraction is graded, i.e. a graded index core, the elastomeric body inner portion 53' may have a graded index within ±5% of the core 33'.

The elastomeric body 50' also has an outer portion 54', or cladding, surrounding the elastomeric body inner portion 53', and has a second index of refraction. The outer portion 54' is optically aligned with the cladding 34' of the optical waveguide 30'. The outer portion 54' advantageously is within ±5% of the index of refraction of the cladding 34' of the optical waveguide 30'. That is, the index of refraction of the elastomeric body outer portion 54' is chosen to be substantially the same as that of the cladding 34' of the optical waveguide 30'. In some embodiments (not shown), the outer portion 54' may be absent and replaced with an extension of the cladding 34' of the optical waveguide 30'.

As will be appreciated by those skilled in the art, the elastomeric property of the elastomeric body 50' may accommodate differences in coefficients of thermal expansion (CTE) of solder bumps 43' and the elastomeric polymer body 50'. Indeed, the monomers that make up the elastomeric body 50' may be chosen so that they impart temperature stability sufficient to be compatible with a solder process. The elastomeric body 50' advantageously guides light and may act as an extension of the optical waveguide 30', for example, to limit any spreading of the light as it transits the length between the optical waveguide 30' and electro-optical component 40'. The elastomeric body 50' body may also be constructed with a refractive index profile (that is, a radial gradient of refractive index) sufficient to achieve a gradient index (GRIN) lens with a focal length appropriate to focus light on the active area of the electro-optical component 40' or upon the core 33' of the waveguide 30' to further reduce loss. The optical body 50' may optionally include a buffer (not shown).

In some embodiments (not shown), the optical body may not be elastomeric, and may be a second optical waveguide. The second optical waveguide has a core and a cladding, wherein the refractive index of the core is greater than the refractive index of the cladding. The core and the cladding of the optical body may have refractive indices within ±5% of the corresponding indices of the optical waveguide to which it couples on the first surface. Similarly, the shape of the core and the cross-sectional area of the core of the optical body and the waveguide preferably may match within about ±5%. In the case where the optical waveguide on the first surface includes a graded index profile, the refractive index profile of the optical body may closely match the refractive index profile of the core of the optical waveguide, for example, within ±5% of the corresponding index profile of the waveguide.

Moreover, in the illustrated embodiments, the optical waveguide 30 is a multimode optical waveguide. That is, the optical waveguide 30 may advantageously support many propagation paths or transverse modes, as opposed to a single mode optical waveguide, which supports a single mode or propagation path. A multimode optical waveguide generally has a larger core diameter, and is used for short-distance communication links and for applications where high power transmission is required, such as in localized networks or between buildings. As such, since the addition or replacement of an optical waveguide may be more prevalent in localized areas where multimode optical waveguides are used, the ability to repeatably optically (and, optionally, mechanically) couple a multimode optical waveguide to an electro-optical component may be a significant advantage. However, it will be appreciated by the skilled artisan that the elastomeric body 50 may also be used with a single mode optical waveguide, which is typically employed for relatively long communication links. Additionally, as will be appreciated by those skilled in the art, the optical device illustrated in FIGS. 1 and 2 may be easier to produce, but may provide decreased performance with respect to the embodiments illustrated in FIGS. 3-5.

Figure 6:
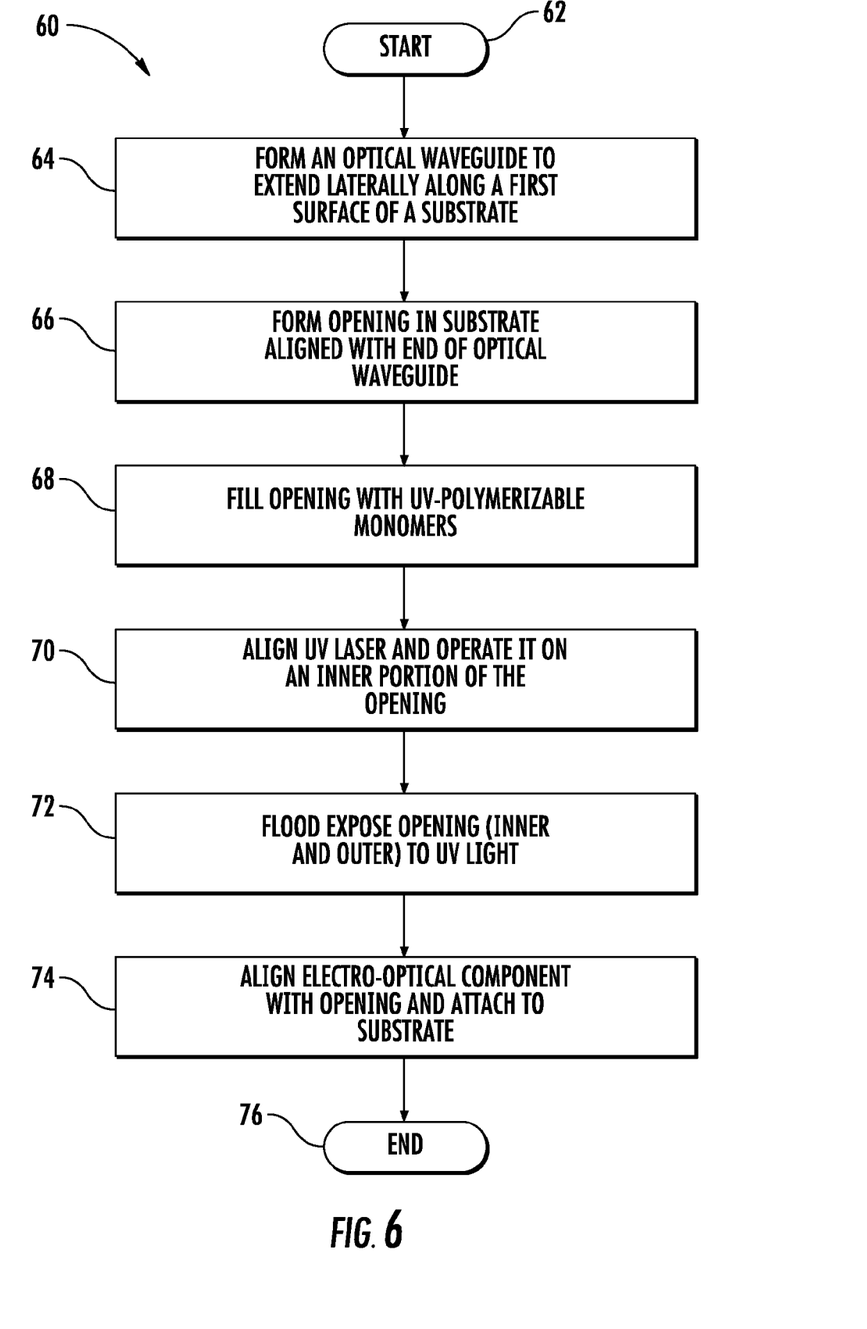
FIG. 6 is a flow-diagram of a method of making an electro-optical device in accordance with the present invention.

Referring now to the flowchart 60 in FIG. 6, a method of making an electro-optical device 20 is illustrated. Beginning at Block 62, the method includes forming an optical waveguide 30 to extend laterally along a first surface 23 of a substrate 21 or circuit board having opposing first and second surfaces 24 (Block 64). At Block 66, an opening is formed in a substrate or circuit board 21 between the first and second surfaces 23, 24. The opening is formed so that it is aligned with the end 31 of the optical waveguide 30. The opening may be formed by drilling, for example, through the circuit board 21 to the optical waveguide.

At Block 68, the opening is filled with a mixture of ultraviolet (UV) polymerizable monomers, preferably comprising a mixture of acrylate monomers having indices of refraction that differ among themselves by more than ±3%, and most preferably, by more than ±5%. The UV polymerizable monomers are selected so that the average of their respective refractive indices is within ±5% of the effective index of the optical waveguide 30.

At Block 70, a collimated UV laser is aligned with a center portion of the opening and operated thereon to form an inner portion 53 or core/center region of a elastomeric polymer body 50. The inner portion 53 of the elastomeric polymer body 50 and the remaining un-reacted polymerizable monomers are "flood" exposed with, for example, a UV lamp or defocused UV laser to finish polymerization of the remaining un-reacted monomers (Block 72).

The combination of the concentrated UV laser on the center portion and the "flood" exposure define the elastomeric polymer body 50 having different indices of refraction corresponding for the inner portion 53 and the outer portion 54 of the elastomeric polymer body 50 (i.e. a gradient index of refraction). This technique may be referred to as photo-locking, wherein the difference in index between the core or inner portion 53 and the cladding or outer portion 54 is created by density differences and by the spontaneous exchange of monomers having different indices of refraction between the inner portion and the outer portion. The effect is enhanced by using formulations of monomers that have widely different indices of refraction, wherein the difference preferably exceeds 3%. As will be appreciated by those skilled in the art, the inner and outer portions 53, 54 of the elastomeric polymer body 50 respectively optically align with the core 33 and cladding 34 of the optical waveguide 30.

Additionally, the elastomeric body 50 may be formed to define the optical bump 55. In some embodiments (not shown), an optical bump 55 may be formed on the circuit board or substrate 21, for example, or on the electro-optical component 40 prior to assembly, as will be appreciated by those skilled in the art. Moreover, in some embodiments, the entire elastomeric body 50 may be exposed to the UV laser or UV flood lamp so that the refractive index thereof is not a gradient refractive index, and is within ±5% of the effective refraction index of the optical waveguide 30.

At Block 74, an electro-optical component 40 is positioned on the second surface 23 and aligned with the opening, and in contact with the second end face 52 of the elastomeric body 50. The method ends at Block 76.

Figure 7:
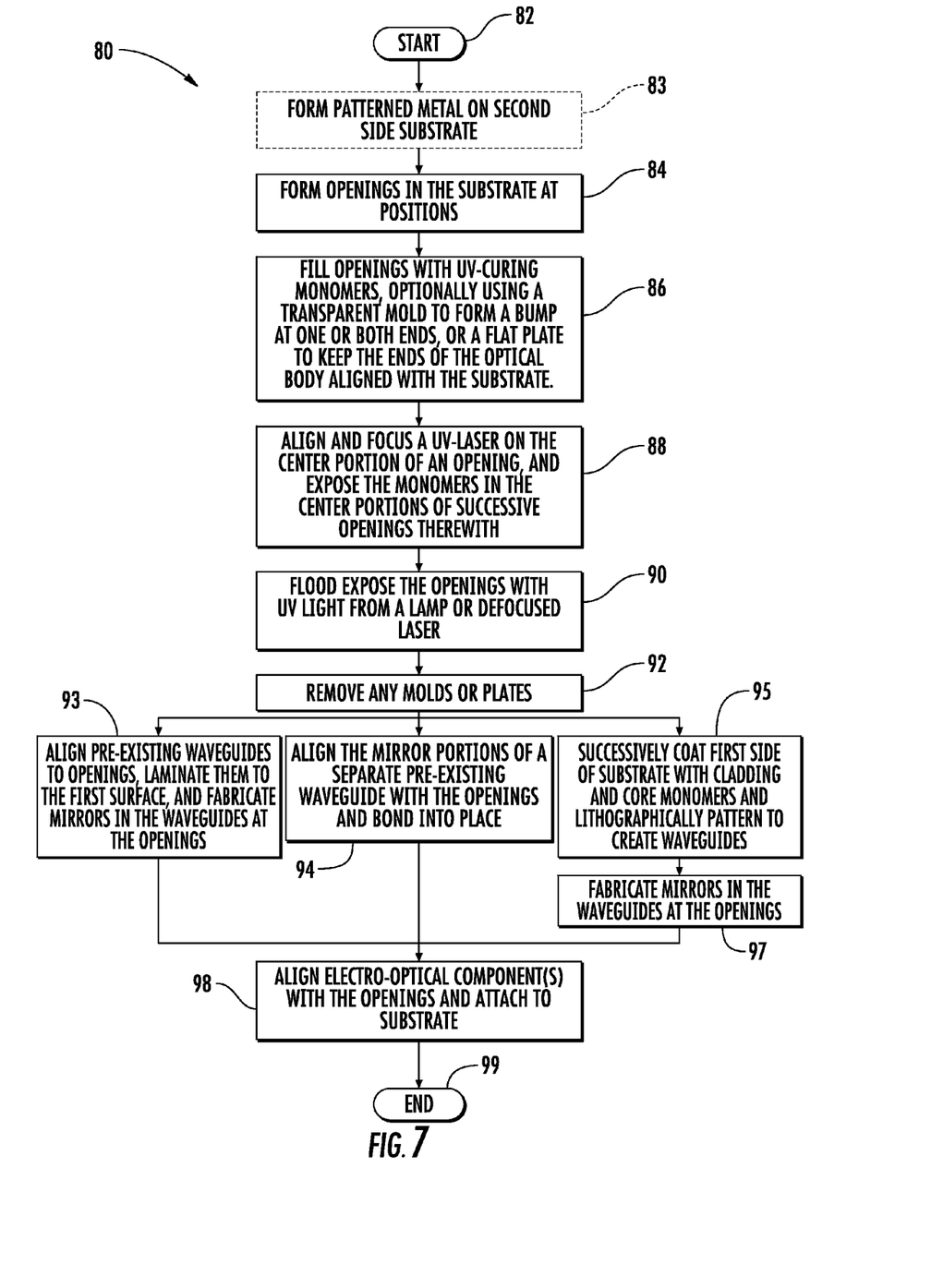
FIG. 7 is another flow-diagram of a method of making an electro-optical device in accordance with the present invention.

Referring now to the flowchart 80 FIG. 7, another method of making an electro-optical device 20' is illustrated. Beginning at Block 82, the method includes optionally patterning metal traces (e.g. electrical connection areas) 26' on one side of a substrate 21' (Block 83). At Block 84, openings are formed in the substrate at positions where the electro-optical component 40' or components are to be mounted. At Block 86, the openings are filled with UV-curing monomers to form the optical body 50'. A transparent mold may optionally be used to define the optical bump 55'. Alternatively, a flat plate may be used to maintain the ends of the optical body 50' planar with the substrate 21'. A UV laser is aligned and focused on the center portion of the opening, and the monomers in the center portions of successive openings are exposed (Block 88). All of the openings are then flood exposed with the UV light from a lamp or a defocused laser (Block 90). Any molds or plates, if used, are then removed at Block 92. Mirror portions of a separate pre-existing waveguide 30' are aligned with the openings and the optical waveguide is bonded into place (Block 94). Alternatively, an array of pre-existing waveguides is aligned with the openings and laminated to the first surface 23' of the substrate 21', and mirrors are subsequently fabricated in the optical waveguides at the openings (Block 93). As a third option, the optical waveguides are fabricated in situ, wherein the first surface 23' is sequentially coated with cladding and core monomers (Block 95) and lithographically patterned to create optical waveguides (Block 96). Mirrors 36' are fabricated in the optical waveguides at positions corresponding to the openings (Block 97). The electro-optical component 40' or components are aligned with the openings and attached to the substrate 21' at Block 98. The method ends at Block 99.

Figure 8:
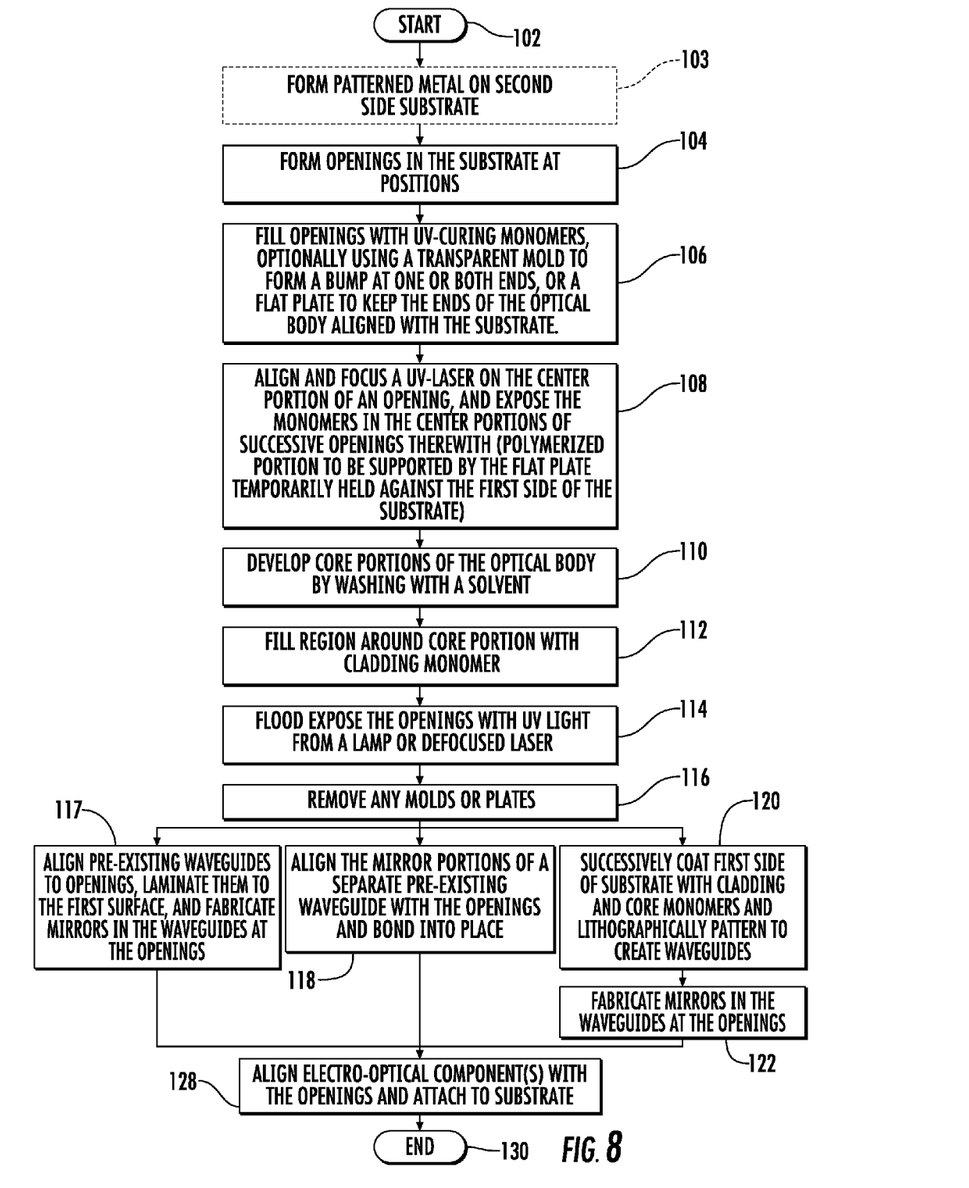
FIG. 8 is yet another flow-diagram of a method of making an electro-optical device in accordance with the present invention.

Referring now to the flowchart 100 in FIG. 8, yet another method of making an electro-optical device 20' is illustrated. Beginning at Block 102, the method includes optionally patterning metal traces (e.g. electrical connection areas) 26' on one side of a substrate 21' (Block 103). At Block 104, openings are formed in the substrate at positions where the electro-optical component 40' or components are to be mounted. At Block 106, the openings are filled with UV-curing monomers to form the optical body 50'. A transparent mold may optionally be used to define the optical bump 55'. Alternatively, a flat plate may be used to maintain the ends of the optical body 50' planar with the substrate 21'. A UV laser is aligned and focused on the center portion of the opening, and the monomers in the center portions of successive openings are exposed (Block 108). The polymerized portion of the optical body is to be supported by a flat plate, for example, temporarily held against the side of the substrate 21' opposing the electrical connection areas 26'. A core portion of the optical body 50' is formed by solvent washing (Block 110). For example, isopropyl alcohol, methanol, or other solvent may be used. At Block 112, the area around the core is filled with a cladding monomer 55'.

All of the openings are flood exposed with the UV light from a lamp or a defocused laser (Block 114). Any molds or plates, if used, are then removed at Block 116. Mirror portions of a separate pre-existing waveguide 30' are aligned with the openings (Block 118) and the optical waveguide is bonded into place. Alternatively, an array of pre-existing waveguides is aligned with the openings and laminated to the first surface 23' of the substrate 21', and mirrors are subsequently fabricated in the optical waveguides at the openings (Block 117). As a third option, the optical waveguides are fabricated in situ, wherein the first surface 23' is sequentially coated with cladding and core monomers (Block 120) and lithographically patterned to create optical waveguides. Mirrors 36' are fabricated in the optical waveguides at positions corresponding to the openings (Block 122). The electro-optical component 40' or components are aligned with the openings and attached to the substrate 21' at Block 128. The method ends at Block 130.

Figure 9:
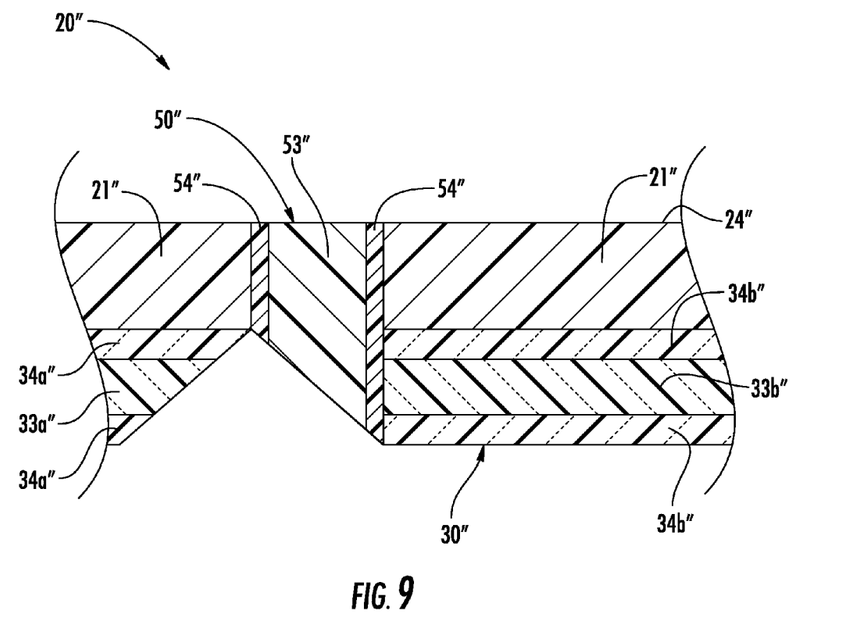
FIG. 9 is cross-section view of a portion of an electro-optical device according to another embodiment of the present invention.

Those skilled in the art will appreciate additional embodiments of the optical device that may be formed according to respective method aspects. For example, referring to FIG. 9, the opening may be formed through the substrate 21" and the waveguide 30", for example, by drilling. The opening is filled to form the optical body 50". A 45-degree mirror may be formed in the end of optical body 50", for example, by laser ablation or an angled saw. It should be noted that a buffer layer of the optical waveguide 30" is not illustrated. As will be appreciated by those skilled in the art, the buffer layer is optional and may be included.

Figure 10A:
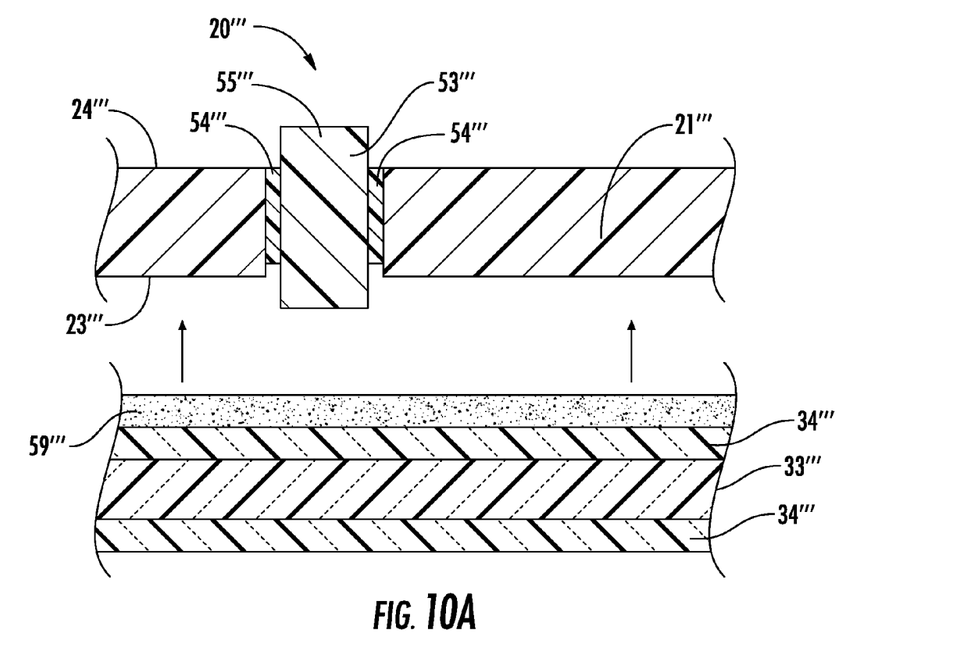
FIG. 10a is an exploded cross-section view of a portion of an electro-optical device according to another embodiment of the present invention.
Figure 10B:
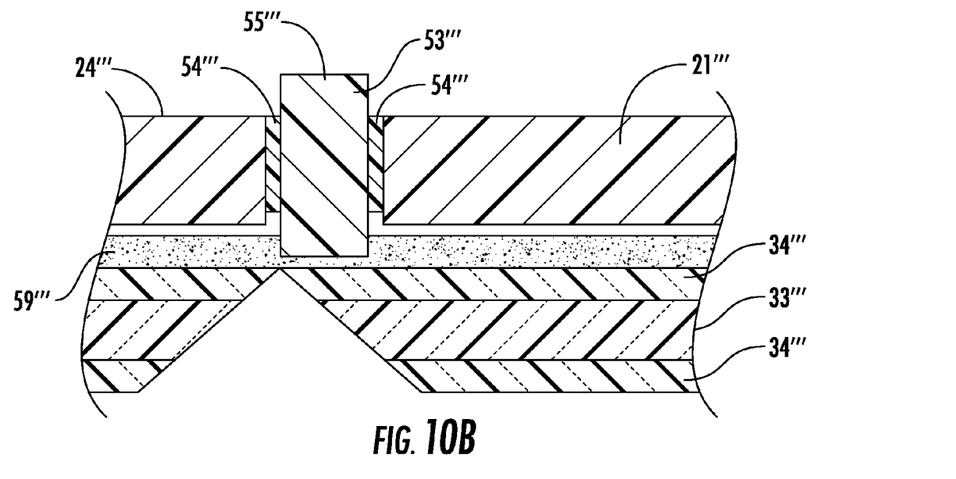

Referring now to FIGS. 10a and 10b, another embodiment of the electro-optical device 20''' is illustrated. The opening may be formed through the substrate 21''', for example, by drilling. The opening is filled to form the elastomeric body 50''' having first and second optical bumps 55a''', 55b''' extending beyond the first and second surfaces 23''', 24''' of the substrate 21'''. An optical waveguide 30''' is laminated to the substrate 21''', using an adhesive 59''', for example. A 45-degree mirror is formed in the optical waveguide 30''', for example, by laser ablation or an angled saw (FIG. 10b).

Figure 11:
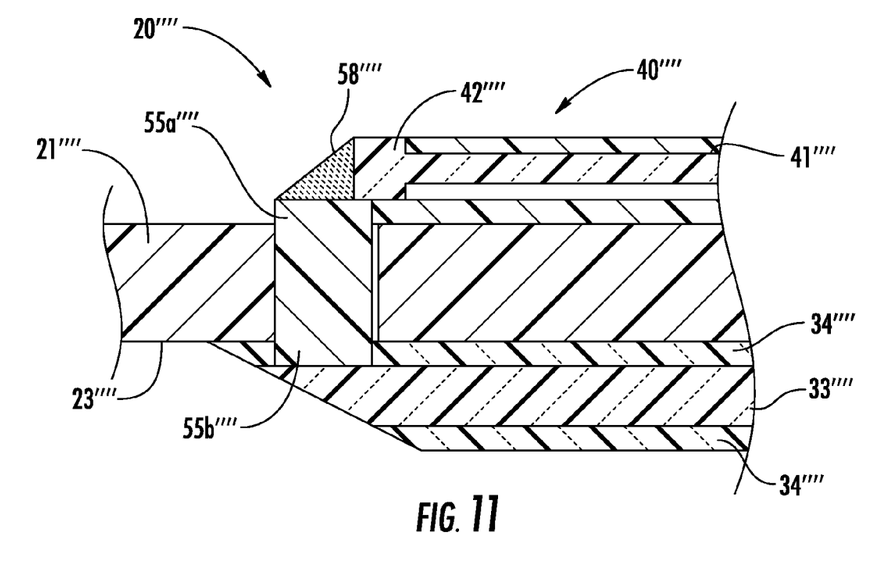
FIG. 11 is a cross-section view of a portion of an electro-optical device according to another embodiment of the present invention.
Figure 12:
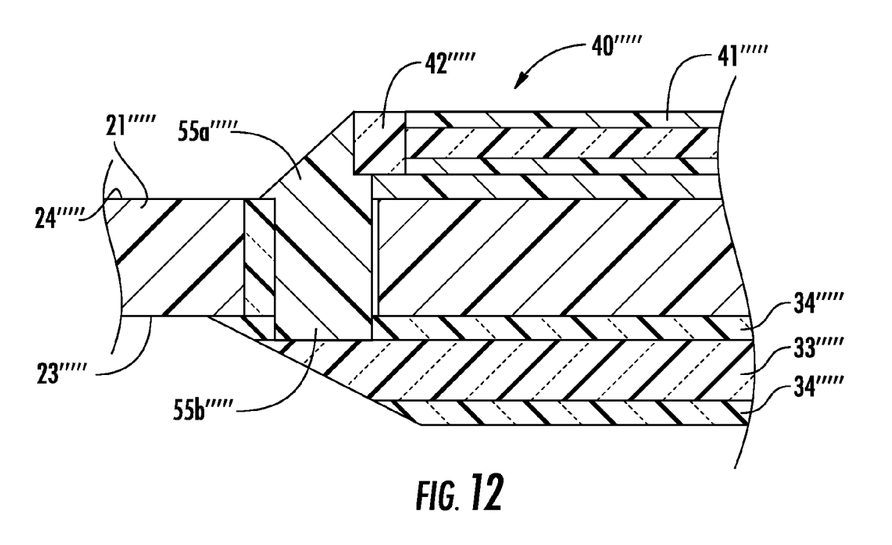
FIG. 12 is a cross-section view of a portion of an electro-optical device according to another embodiment of the present invention.

Referring now to FIG. 11, an "edge-fire" electro-optical component 40'''' is mounted to the substrate 21'''' using a micro-optic prism 58'''', for example, aligned with the first and second optical bumps 55a'''', 55b'''' defined by the elastomeric body 50'''' portions extending outwardly beyond the surfaces of the substrate 21''''. Referring now to FIG. 12, the "edge-fire" electro-optical component 41''''' is mounted using an elastomeric body 50''''' that has been either molded or cut to provide a mirrored face on the second surface 24''''' or component side of the substrate 21'''''. Thus, a micro-optic prism is not included.

Further details of elastomeric polymers bodies and coupling of optical waveguides may be found in co-pending application Ser. Nos. 12/610,458, 12/610,420, 12/610,432, 12/610,410, 12/610,404, all of which are assigned to the assignee of the present application, and the entire contents of all of which are herein incorporated by reference. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications, and embodiments are intended to be included within the scope of the appended claims.

That which is claimed is:
1. An electro-optical device comprising:
a substrate having opposing first and second surfaces and an opening extending therebetween;
an optical waveguide extending laterally along the first surface and having an end aligned with the opening;
an electro-optical component carried by the second surface and aligned with the opening; and
an elastomeric body within the opening and having a first end face adjacent said optical waveguide and having a second end face adjacent said electro-optical component, said elastomeric body having a radial gradient of refractive index so that said elastomeric body defines a gradient index (GRIN) lens.
2. The electro-optical device of claim 1, wherein the first end face contacts said optical waveguide, and wherein the second end face contacts said electro-optical component.

3. The electro-optical device of claim 1, wherein said elastomeric body and said optical waveguide have respective gradient refraction indices within ±5% of each other.

4. The electro-optical device of claim 1, wherein said elastomeric body and said optical waveguide have respective refraction indices within ±5% of each other.

5. The electro-optical device of claim 1, wherein the second end face of said elastomeric body extends outwardly beyond the second surface defining an optical bump pressed against said electro-optical component.

6. The electro-optical device of claim 1, wherein said elastomeric body comprises an elastomeric polymer.

7. The electro-optical device of claim 1, wherein said elastomeric body comprises a core and a cladding surrounding the core, and wherein said core has a higher index of refraction than said cladding.

8. The electro-optical device of claim 1, further comprising a reflective coating on the end of said optical waveguide.

9. The electro-optical device of claim 1, wherein said optical waveguide comprises a core, a cladding surrounding said core, and a buffer layer surrounding said cladding.

10. The electro-optical device of claim 1, wherein said substrate comprises a circuit board having a plurality of electrical connection areas; wherein said electro-optical component comprises a package, an optical device within said package, and a plurality of electrical connection areas carried by said package and coupled to corresponding ones of the electrical connection areas of said circuit board.

11. The electro-optical device of claim 10, further comprising an underfill material between said package and adjacent portions of said circuit board.

12. An electro-optical device comprising:
a substrate having opposing first and second surfaces and an opening extending therebetween;
an optical waveguide extending laterally along the first surface and having an end aligned with the opening;
an electro-optical component carried by the second surface and aligned with the opening; and
an elastomeric polymer body within the opening and extending outwardly beyond the second surface, and having a first end face contacting said optical waveguide and a second end face pressed against said electro-optical component, said elastomeric polymer body having a radial gradient of refractive index so that said elastomeric polymer body defines a gradient index (GRIN) lens.

13. The electro-optical device of claim 12, wherein said elastomeric polymer body comprises a core and cladding surrounding the core, and wherein said core has a higher index of refraction than said cladding.

14. The optical device of claim 12, wherein said elastomeric polymer body and said optical waveguide have respective gradient refraction indices within ±5% of each other.

15. The electro-optical device of claim 12, wherein said elastomeric polymer body and said optical waveguide have respective refraction indices within ±5% of each other.

16. The electro-optical device of claim 12, further comprising a reflective coating on the end of said optical waveguide.

17. The electro-optical device of claim 12, wherein said substrate comprises a circuit board having a plurality of electrical connection areas; wherein said electro-optical component comprises a package, an optical device within said package, and a plurality of electrical connection areas carried by said package and coupled to corresponding ones of the electrical connection areas of said circuit board.

18. The method of claim 16, wherein the elastomeric body and the optical waveguide have respective gradient refraction indices within ±5% of each other.

19. A method of making an electro-optical device comprising:
forming an optical waveguide to extend laterally along a first surface of a substrate having opposing first and second surfaces and an opening extending therebetween with an end of the optical waveguide aligned with the opening;
forming an elastomeric body within the opening and having a first end face adjacent the optical waveguide and having a second end face; and
positioning an electro-optical component adjacent the second surface, aligned with the opening, and adjacent the second end face of the elastomeric body, the elastomeric body having a radial gradient of refractive index so that the elastomeric body defines a gradient index (GRIN) lens.

20. The method of claim 19, wherein forming the elastomeric body comprises forming the elastomeric body to have the first end face contacting the optical waveguide and the second end face contacting the electro-optical component.

21. The method of claim 19, wherein positioning the electro-optical component comprises positioning the electro-optical component on the second surface, and in contact with the second end face of the elastomeric body.

22. The method of claim 19, wherein forming the elastomeric body comprises forming the elastomeric body to extend outwardly beyond the second surface to define an optical bump pressed against the electro-optical component.

23. The method of claim 19, wherein the elastomeric body and the optical waveguide have respective refractive indices within ±5% of each other.

24. The method of claim 19, wherein forming the elastomeric body comprises forming an elastomeric polymer.

25. The method of claim 19, wherein forming the elastomeric body comprises forming a core and forming a cladding to surround the core, and wherein the core has a higher index of refraction than the cladding.

26. The method of claim 19, further comprising forming a reflective coating on the end of the optical waveguide.

27. A method of making an electro-optical device comprising:
forming an optical waveguide to extend laterally along a first surface of a substrate having opposing first and second surfaces and an opening extending therebetween with an end of the optical waveguide aligned with the opening;
forming an optical body within the opening and having a first end face adjacent the optical waveguide and having a second end face by at least filling the opening with a photo-curable material, and curing the photo-curable material; and
positioning an electro-optical component adjacent the second surface, aligned with the opening, and adjacent the second end face of the optical body, the elastomeric body having a radial gradient of refractive index so that the elastomeric body defines a gradient index (GRIN) lens.

28. The method of claim 27, wherein filling the opening with the photo-curable material comprises filling the opening with an ultra violet (UV) curable material.

29. The method of claim 27, wherein curing the photo-curable material comprises selectively exposing a center portion of the photo-curable material to light, and then exposing all the photo-curable material to light.

\* \* \* \* \*